United States Patent [19]

Stoakes

[11] E Re. 30,432

[45] Reissued Nov. 11, 1980

[54] STRUCTURAL ASSEMBLIES

[76] Inventor: Richard L. Stoakes, "Clouds", Northdown Rd., Woldingham, Surrey, England

[21] Appl. No.: 879,797

[22] Filed: Feb. 21, 1978

Related U.S. Patent Documents

Reissue of:

[64] Patent No.: 3,940,897
Issued: Mar. 2, 1976
Appl. No.: 430,036
Filed: Jan. 2, 1974

[30] Foreign Application Priority Data

Jan. 10, 1973 [GB] United Kingdom ..... 1285/73

[51] Int. Cl.[2] ..... E04B 2/88; E04B 1/00

[52] U.S. Cl. ..... 52/395; 52/235; 52/397; 52/403; 52/464; 52/772

[58] Field of Search ..... 52/395, 397, 403, 463, 52/464, 235, 208, 772, 459

[56] References Cited

U.S. PATENT DOCUMENTS

| | | | |
|---|---|---|---|
| 2,363,429 | 11/1944 | Lowry | 52/395 X |
| 3,052,330 | 9/1962 | Hammitt et al. | 52/395 X |
| 3,138,229 | 6/1964 | Hubbard | 52/400 X |
| 3,235,039 | 2/1966 | O'Donnell | 52/235 |
| 3,604,170 | 9/1971 | Stoakes | 52/208 X |
| 3,769,775 | 11/1973 | Brzezinski | 52/235 X |
| 3,805,470 | 4/1974 | Brown | 52/400 |
| 4,015,390 | 4/1977 | Howorth | 52/772 |

FOREIGN PATENT DOCUMENTS

| | | | |
|---|---|---|---|
| 229350 | 9/1956 | Australia | 52/235 |
| 1960395 | 6/1971 | Fed. Rep. of Germany | 52/400 |
| 2400954 | 7/1974 | Fed. Rep. of Germany | 52/464 |
| 958990 | 9/1949 | France | 52/464 |
| 709039 | 5/1954 | United Kingdom | 52/464 |
| 790903 | 2/1958 | United Kingdom | 52/464 |

*Primary Examiner*—J. Karl Bell
*Attorney, Agent, or Firm*—Hopgood, Calimafde, Kalil, Blaustein & Lieberman

[57] ABSTRACT

A planar structural assembly has a series of cells formed by elongate structural members, the cells each receiving a pane or panel. To provide a weather-seal, closed loops of resilient sealing strips extend around the exterior edge of each pane or panel and are mounted on auxiliary members secured to the structural members. The auxiliary members clamp the sealing strips in compression against their panes or panels to ensure the seal there. The contiguous edges of the sealing strips of adjacent cells are locked in place and a seal formed between them by locking or zipper strips.

14 Claims, 8 Drawing Figures

Figure 1:
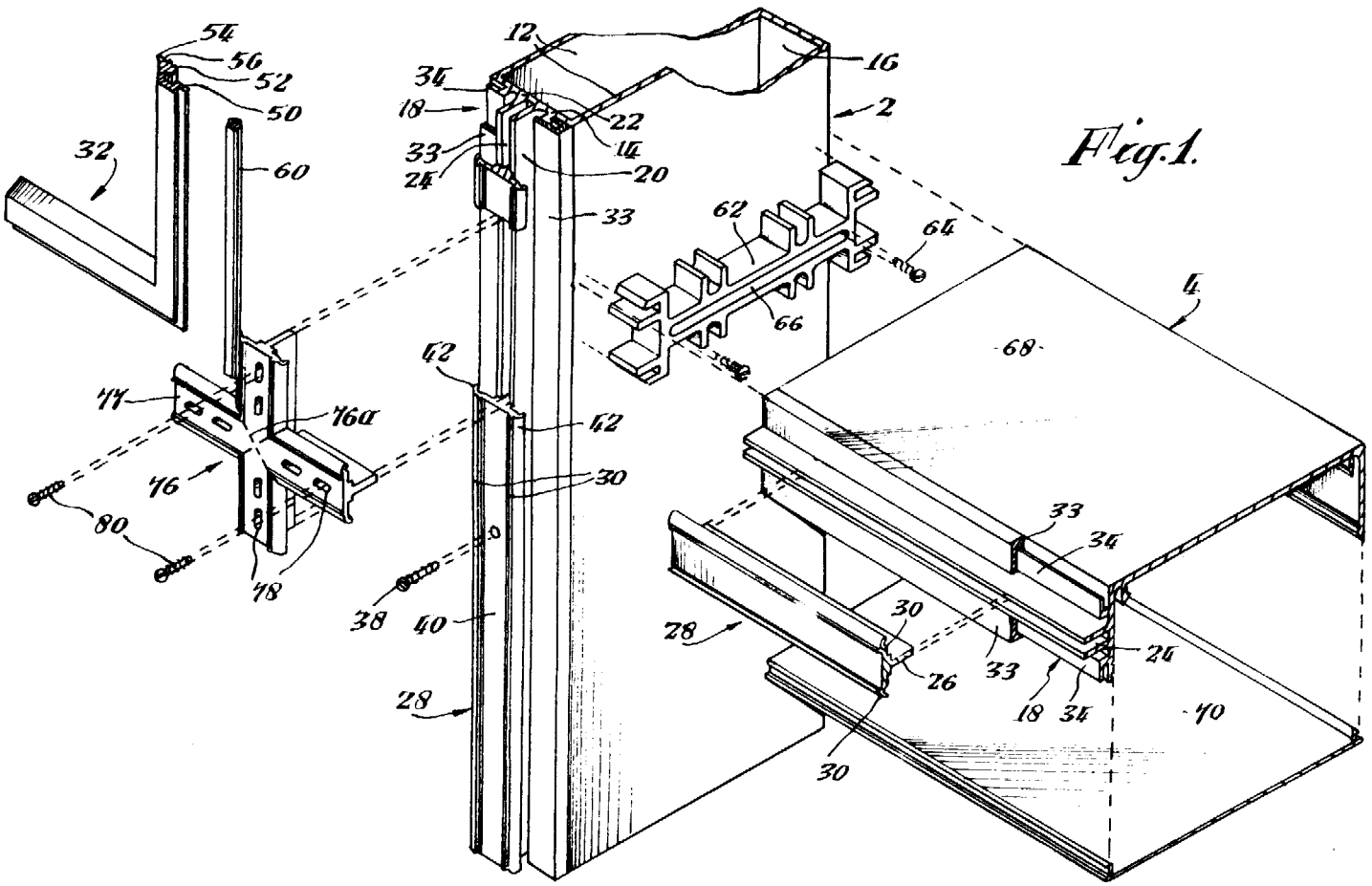

4
68
70
26
34
33
18
16
2
64
66
62
30
28
22
14
20
12
24
42
40
38
16a
48
60
54
56
52
50
32
46
44
80

STRUCTURAL ASSEMBLIES

Matter enclosed in heavy brackets [ ] appears in the original patent but forms no part of this reissue specification; matter printed in italics indicates the additions made by reissue.

This invention relates to structural assemblies for buildings and is particularly concerned with constructions in which an area is filled using a pane or panel or a plurality of smaller panes (i.e. transparent or translucent sheets) and/or panels mounted in a frame structure.

According to one aspect of the invention there is provided a structural assembly comprising a series of rigid elongate members secured together to form a frame structure defining at least two enclosed spaces arranged to receive infill elements panes or panels, and means making a seal between the members and each said pane or panel, said means comprising a flexible inner sealing device for each said space in the form of a closed loop of a strip-like material engaging the frame members at the periphery of the space, and auxiliary rigid frame elements clamping said sealing devices in place, further bridging sealing means being provided between adjacent edges of respective sealing devices at the common boundary or boundaries between each contiguous pair of said spaces.

According to another aspect of the invention, there is provided a structural assembly comprising a series of rigid elongated elements secured together to form a frame structure defining at least one enclosed space arranged to receive an infill pane or panel, and means making a seal between the members and said pane or panel, said means comprising an inner flexible sealing device for the space in the form of a closed loop of a strip-like material engaging the frame members at the periphery of the space and auxiliary rigid frame elements clamping said sealing device in place at least one peripheral flexible sealing device being disposed outwardly of said loop-forming sealing device at the external periphery of said frame structure, and further, bridging sealing means being provided between adjacent edges of the or each peripheral sealing device and the contiguous loop-form sealing device or devices at the common boundary or boundaries between said peripheral device and said loop-form device or devices.

Particularly when the assembly is relatively large it is preferable to secure the frame members together in such a way that they are free to make slight movements relative to each other, e.g. for thermal expansion and for building movements.

In a preferred form of the invention, the or each said pane or panel has its edges sealingly located between said loop-form sealing devices and rear sealing members disposed in opposition to said sealing devices. The auxiliary frame elements can comprise forward portions projecting laterally from a central securing portion, said forward portions being adapted to extend over the edges of the or each associated pane or panel and thereby to apply sealing pressure to said edges. This can conveniently be done by arranging that said loop-form sealing devices locate on said forward portions of the auxiliary elements to extend around at least a part of the front and rear surfaces thereof, that portion of each device at the rear of the forward portions being clamped in compression against the associated pane or panel. A recess between the front faces of said forward portions can provide a keying engagement for the sealing devices.

Preferably said forward portions are provided with rearward projections disposed intermediate the lateral extent of rear portions of the sealing devices engaging the pane or panel, the clamping pressure referred to above being applied through said projections. Preferably also the rear faces of the sealing devices bearing on the pane or panel are given a profile providing a plurality of laterally spaced lines of sealing therewith, such that said profile includes a marginal lip providing one of said lines of sealing that is disposed beyond the lateral extent of said frame element forward portion.

Figure 1A:
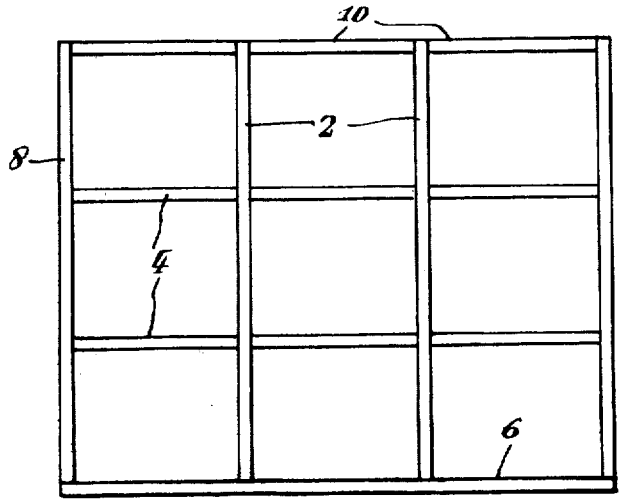
Figure 4:
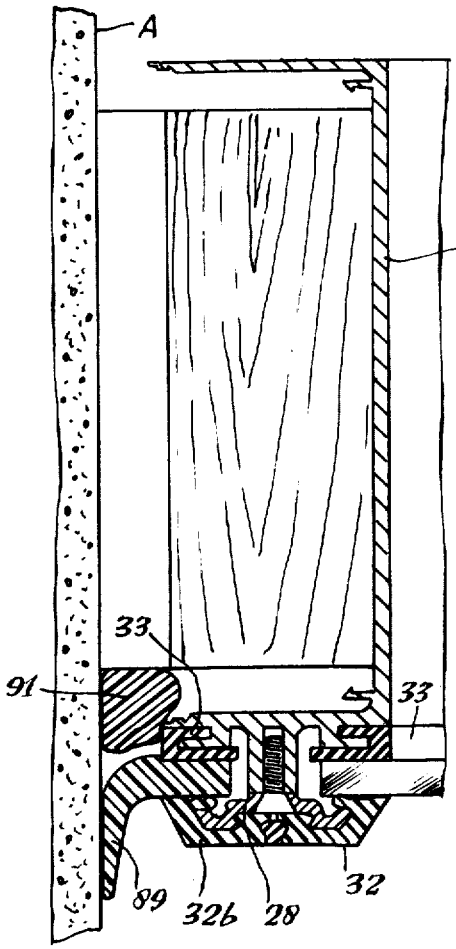
Figure 4A:
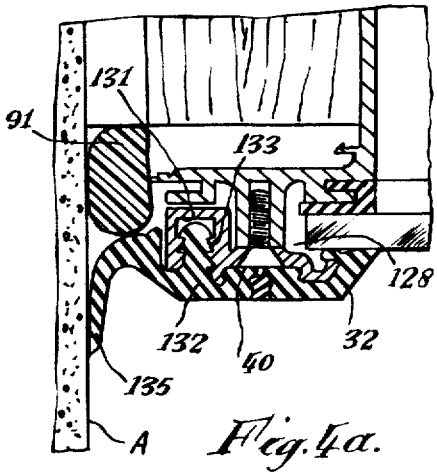
Figure 2:
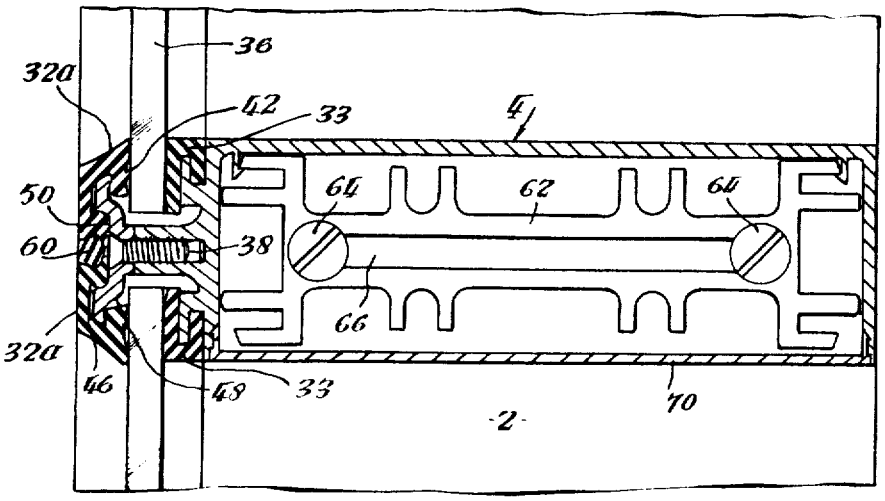
Figure 3:
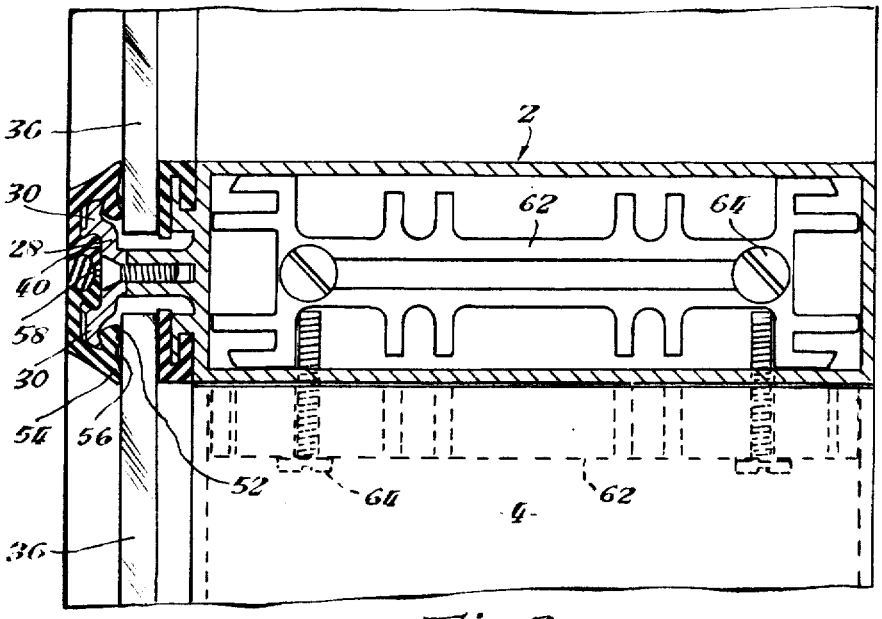
Figure 5:
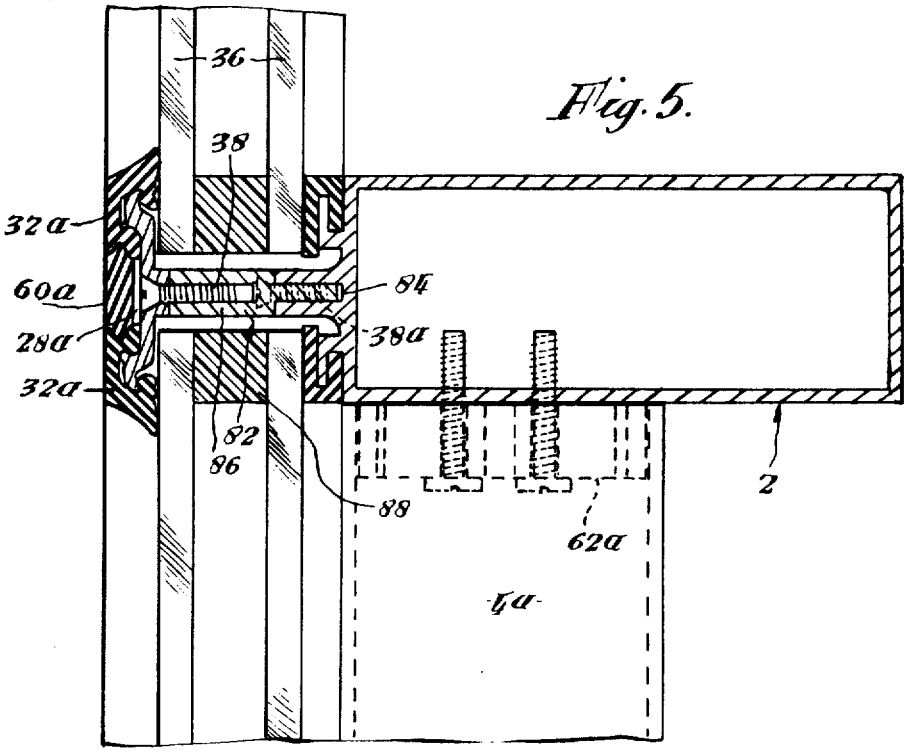
Figure 6:
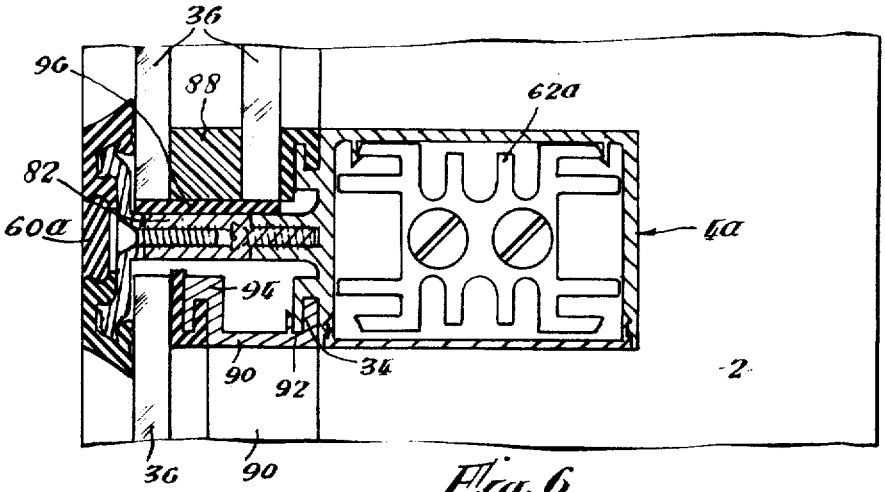

By way of example, the invention will be more particularly described with reference to the accompanying drawings, wherein:

FIG. 1 is an exploded perspective view showing some of the components at a mullion/transom junction in one embodiment of structural assembly according to the invention, FIG. 1a illustrates schematically the complete assembly, FIG. 2 is a side view of the junction of FIG. 1, FIG. 3 is a plan view of a part of the same structural assembly showing the attachment of a transom to a mullion and of a mullion to a lower sill, FIG. 4 is a view in a horizontal plane of a part of the same structural assembly at a jamb, FIG. 4a shows a modification of the construction in FIG. 4 as seen in the same horizontal plane, FIG. 5 is a plan view showing a modification of the assembly of the preceding figures to provide double glazing or a sandwich wall, and FIG. 6 is a further illustration of the modification in FIG. 5 showing how transition can be achieved between single and sandwich panes or panels in successive cells of the structural assembly.

The drawing shows embodiments of the invention in which a frame structure, as illustrated in FIG. 1, is composed of a series of mullions 2 extending upwardly from a bottom cill member 6, and connected by transoms 4, the opposite side edges of the structure being formed by jamb mullions 8 and the upper edge of top sill members 10. The sealing arrangements are similar for all the members, as will be explained below, and detailed illustration of only some of the members is all that is necessary for an understanding of the invention.

Each mullion 2 comprises a main box section having relatively deep side walls 12 joined by a front wall 14 and a rear wall 16. A forwardly projecting channel-like formation 18 located centrally on the front wall 14 is made up of a pair of parallel flanges 20 with stiffening root fillets 22. In the slot 24 between the flanges 20, central web 26 of an extruded generally T-form auxiliary frame element 28 is a free fit. (Similar auxiliary frame members are associated with the other members forming the frame structure and co-operate with them in a similar manner.) The side limbs 30 of the element 28 receive opposite-handed extruded sections 32a of respective outer sealing gaskets 32 that, in conjunction with inner sealing strips 33 mounted on flanges 34 of the mullion, seal the edge of a pane or panel 36 clamped between them. The clamping pressure is applied by the auxiliary frame element 28 and is obtained by tightening countersunk screws 38 securing it to the frame element, these passing through spaced apertures along the length of the frame element and projecting laterally of the element to be gripped by the opposed faces of the flanges 20.

The side limbs 30 of the T-form auxiliary element are profiled to provide a recess 40 between them with re-entrant side faces and at the edges of the limbs are rearwardly directed lips 42. The gaskets 32 are made of a resilient material and can initially be mounted on the auxiliary elements 28 in a substantially undeformed state. Each section 32 comprises a female region that generally fits its associated side limb 30 but with some slight clearance at the forward and outer regions 46 of the side limbs and also at the rear regions 48 inwardly of the lips 42, where the element is forwardly recessed, the purpose of which will be described below. Inner side margin 50 can fit into one side of recess 40 of the auxiliary element.

The rear face of each section 32a comprises an inner lobe 52 located slightly inwardly of the recess 48 on its associated frame element side limb 30. An outer lobe 54 lies outwardly of the side limb and in the unstrained state of the section projects rearwards slightly more than the lobe 52. Between these two lobes, approximately coincident laterally with the lip 42, is an auxiliary ridge 56 shallower than either of the lobes.

Between the margins 50 of the two adjacent sections 32a in the recess 40, there is a small gap 58 sufficient for both sections to be assembled on the frame element 28 without interference with each other. In the front of the gap 58, a profiled space between the two sections is arranged to receive a zipper or locking strip 60 of a material that is hard in relation to the material of the gaskets 32, but that it is also elastically deformable, to form a seal with the juxtaposed sections. It is to be noted that the maximum width of the zipper strip cross-section lies within the tapered sides of the recess 40 so that the zipper strip cannot work loose when inserted.

The zipper strip 60 is not inserted until after the gaskets 32 have been clamped into sealing engagement with the panes or panels 36, as will be described below. This clamping action is obtained by tightening the screws 38 and has the effect of deforming the gasket profile to bring both lobes 52, 54 and the ridge 56 into engagement with the clamped pane or panel. In the tightening process the outer lobe 54 of each section first engages the pane or panel and begins to be flexed outwards, the clearance at 46 facilitating this action. As said flexing begins, the inner lobe 52 engages the pane or panel and after being urged more firmly into the recess 48 it also begins to flex but inwards because of its location relative to the relative to the recess 48. This deformation thus acts in opposition to the outward flexing of the lobe 54 and intending to draw the section inwards and under the frame element side limb 30 assists in preventing wrinkling of the front face of the section as the outer lobe 54 is fully deformed.

When the edge of a pane or panel is clamped, the clamping pressure is applied almost wholly through the lobe 52 directly from the associated frame element side limb 30. The ridge 56, the function of which is to provide an intermediate line seal, will bear with little pressure because of its small size in relation to the lobe 52, while the lobe 54 is able to flex relatively freely as the clamping pressure increases due to the fact that it is well beyond the lateral extremity of the side limb 30. It will be noted thus that the primary seal afforded by the lobe 54 is obtained separately from the clamping effect afforded by the lobe 52 while the greater the clamping pressure applied, the more firmly are the sections 32 held in place on the side limbs 30.

In the use of the invention, e.g. for curtain walling, the various components can be cut to size and preformed before they are brought to the building site. The frame members and the auxiliary elements will themselves be formed from extruded metal sections, the elements 28 having holes drilled at intervals along their length to receive the screws 38. The sealing gaskets will each be formed as a closed loop: that is to say, the frame structure will itself be of a cellular nature (in its simplest form each of the cells being of rectangular form, e.g. as defined between adjacent lines of mullions and transoms) and a sealing gasket will thus comprise lengths of an extruded section having the cross-section illustrated with specially moulded junction pieces having a similar cross-section bonded to the ends of these lengths to join them in the closed loop. A rectangular cell will then have a sealing gasket in the form of a rectangular loop with the four lengths forming the sides of the rectangle joined by relatively small L-pieces with which they are integrally moulded.

The initial state of the assembly involves the erection of the main members of the structure. The bottom sill member 6, is first secured in place and exturded spigot members 62 are mounted on this by screws 64 passing through a central slot 66 to locate the bottom ends of the mullions and the jamb mullions. At the tops of the mullions and jamb mullions, on their side faces, further spigot members are provided to engage the top sill members 10 running between adjacent pairs of these vertical members of the frame structure. The transoms are similarly supported by spigot members on the mullions and jamb mullions and the assembly of a transom is shown in some detail in FIG. 1 where it will be seen that this member comprises a main channel-form section 68 which can be simply dropped onto the spigot members between which it runs, the bottom face of the member then being closed by a snap-on capping 70. It is to be noted that the spigot form connections allow relative movements, e.g. of the transoms transversely to the mullions, that can take up differential thermal expansion effects.

The inner sealing strips 33 can all be cut to length and mounted on their flanges 34 of the frame members before assembly. At the junctions between frame members, the sealing strips 33 are in abutment with each other but there is special provision made at these junction regions for the auxiliary frame element as will be subsequently described.

To describe now the glazing or infill of the frame structure thus erected it will be convenient to presume that the structure is in the form of a rectangular grid i.e. comprising a number of vertical columns side-by-side each column being made up of a series of cells of rectangular form above each other, the mullions forming the divisions between the successive columns and the transoms the divisions between successive cells in each column.

The glazing or infill process is tackled column by column, starting from the bottom of each. Thus, first the T-section auxiliary element of the bottom cill member is secured loosely in place, and, with the pane or panel supported on that element, the first transom auxiliary element is in turn secured loosely over the top edge of the pane or panel. At this stage, short lengths of the sections of the sealing gasket material are provided at the central regions of these upper and lower T-section elements to retain the pane or panel more safely in these initial stages when it is not firmly gripped around its periphery.

The next pane or panel in that column can now be supported on the first transom auxiliary frame element and similarly be secured at its upper edge by mounting the second transom auxiliary frame element. This procedure is then repeated over the full height of the column until the top edge of the uppermost pane or panel is held by the upper cill auxiliary frame element, and a second column of panes or panels immediately adjacent the first is similarly mounted on the frame structure, building up from the bottom.

With the second column completed, auxiliary frame elements can be secured loosely onto the mullion between the columns and similarly a further series of mullion frame element can be attached with the completion of each succeeding column. Of course, at the jamb mullions, the auxiliary frame elements can be attached there and the panes and panels in the column adjacent the jamb can be mounted whether or not there is a further column in place.

To maintain integrity of sealing at the junction regions of the frame members at the corner of each cell, special provisions are employed and in the arrangement illustrated in FIG. 1, the extruded T-section auxiliary frame elements 28 terminate a few inches short of each junction and a specially cast T-section, exemplified by the cruciform unit 76, is provided at the junction to make up the gap, the limbs of the unit each have an identical cross-section to the frame elements 28. Alternatively, it may be more convenient to make up the junction joint from short lengths of the extruded T-section, mitered as indicated at 76a to form respective arms 77 that are individually attached to the frame members. Whichever method is used, at the mullion/transom junction shown, the arms of the cruciform unit or assembly have elongated apertures or slots 78 for attaching screws 80 to secure the unit to the mullion and the transoms.

The apertures are elongated to allow relative movement between the unit and each transom and so avoid constraint of thermal stresses between these members. It will be appreciated that the spigots 62 also allow such movements to take place. Although no movement is required between the junction unit and the mullion, by forming all four apertures as elongate slot errors of assembly are avoided. It will be appreciated from the foregoing that, in the initial assembly, some small gap will be left between the transom auxiliary frame elements 28 and their adjacent arms of the junction unit but that this precaution is not necessary for the auxiliary frame elements on the mullion. Of course, at the outer margins of the frame, further units of T- and L-section will serve similar functions to the cruciform unit shown and where appropriate allowance can be made at these junctions also for thermal movements.

Once all the T-section frame elements are in place, the temporary retaining lengths of sealing gasket sections can be removed, preferably after the T-section junction units have been put in place. The panes or panels are able to move because of the looseness of attachment of the auxiliary frame lements, but they cannot fall from the frame structure.

On each cell of the grid, the prefabricated retangular outer sealing gaskets are now mounted but the inner side margin 50 of each gasket is left out of the recesses 40 so that the heads of the screws 38 remain exposed and the screws can then be tightened up to make the seal between the gasket and the pane or panel in the manner already described. These side margins of the gaskets can now be slid into position in the recesses 40. By using a roller tool it is possible to do this at the same time as the zipper strip 60 is inserted. At the junction regions, e.g. on the cruciform T-section unit 76, the mullion zipper strip can run continuously through the region and the zipper strips of the two transoms can then abut this first strip.

In order to ensure that the sealing gaskets have their front limbs held firmly in the recesses 40 of the frame elements 28, to prevent inward leakage of moisture by this route, the zipper strips are arranged to apply a substantial compression force to these portions of each gasket by cutting the zipper strips slightly over-length and inserting the zipper strips under considerable longitudinal compression. Initially the compressed strip will not extend the length of the space provided for it but if it is ensured that it can expand to relieve some of the compressive force in it, preferably by first applying an anti-friction coating in the slot, after assembly it will fill the space provided and so apply the residual compression in it evenly to the full length of the gasket on which it bears.

It will be appreciated that at each outer or peripheral edge of the frame structure, the closed or loop-form gaskets there engage only the inner limb of the auxiliary T-section elements. Along the outer limbs of the T-section elements at the peripheral edge of the frame structure, as for example at the jamb mullion 8 in FIG. 4, straight lengths of gasket 32b having a section corresponding to the closed-loop gaskets 32 extend the length of each side of the frame to abut or to be boned to L-form corner pieces (not shown) made up of the same section material. The lengths 32b have a free length such that they are held in compression when assembled and they engage outwardly extending flexible sealing strips 89 that project from the frame structure to bear sealingly on the surrounding aperture boundary A or other construction on which the frame structure is mounted. It may be noted here that for simplicity the jamb mullion section may be the same as the main transom section 68, although of course a capping is not used here. As an additional protection, mastic 91 is injected behind the strip 89.

An alternative arrangement to that in FIG. 4 is shown in FIG. 4a. This uses a modified T-section 128, that differs from the element 28 by having an extended outer limb 129 comprising a socket 131 gripping sealingly a length of gasket 132. The socket and the gripped portion of the gasket have complementary ribbed surfaces 133 for secure engagement and the gasket also comprises an integral extension 135 sealing against the edge of the aperture in the same manner as the strip 89. The formation of the gasket 132 in other ways, and in particular as regards its engagement in the forward recess 40 of the element 128, it similar to that of the gasket 32.

In a modified arrangement of the junction regions of the frame structure, the use of specially cast or moulded I-section junction units can be avoided by mitering small lengths of the extruded T-section material to build up the cruciform or other shape required, these separate elements being secured in place with their mitred ends abutting. In the mullion/transom junction of FIG. 1, the elements of this junction assembly that extend along the mullion would then be secured by screws through circular apertures preventing longitudinal movement. The elements of the assembly extending along the transoms would have the slotted apertures shown in the cast junction unit 76 but there would also be circular apertures immediately adjacent their mitred ends for screws that are tapped into the flanges 34 of the mullion so that these elements are held fixed relative to the elements on the mullion.

As is the case with the cast unit, the main T-section elements of the mullion can abut onto the shorter elements of the junction assembly (although it is likely that the need for manufacturing tolerances would require some slight clearance) but a definite clearance is left between each main transom T-section and their associated elements of the junction assembly.

As a further possibility, the main T-section elements can be extended into the junction regions where they have their ends mitred to leave only the small gaps required for thermal movements of the transoms (and top cills). In this event, the gaps at the mitred joints will normally require the presence of further sealing material and this can be provided by thickening the section of the sealing gaskets at their corner regions. To ensure that the sealing material is applied firmly to the gaps, it is also desirable that the zipper strips be fitted without any possibility of a discontinuity at the junction region: for this purpose, the sectional material of the zipper strip can be used to form an integral junction unit, (i.e. a cruciform unit at the mullion/transom junction) with short arms extending into all the T-section elements meeting at that junction, these arms abutting main zipper strip lengths running between successive junction regions.

Preferably, in such a zipper strip unit the sectional form is itself thickened at the corners where its arms meet, e.g. the arms having radiussed fillets at the corners, in order to increase the sealing pressure it applied to the corner regions of the gaskets when they are pressed the gaps between the T-sections elements. As already described, of course, the main lengths of zipper strip are compressed when inserted and it is arranged that as they expand to fill their slots they in turn apply compression to the zipper strip units at the junctions.

FIG. 5 of the drawings illustrates the provision of a double-glazing or sandwich infill in a structural assembly according to the invention. The sections of the frame members can be identical to those in the embodiment of FIGS. 1 to 3, although there is shown here a rather narrower transom 4a with a correspondingly smaller suspension spigot 62a. Modified auxiliary frame elements 28a are provided which differ from the elements 28 of FIGS. 1 to 4 in that a substantially wider recess 40a is provided between the side limbs 30. In other respects, however, the elements 28 and 28a are identical.

To provide for the increased thickness of the infill the frame members' section may be modified to have a corresponding deepened front channel formation 18. For manufacturing reasons, however, it may be preferred to build up the increased depth by using supplementary sectional members 82 so that the elements 28a are connected to the frame members through the supplementary sectional members 82 which are interposed between said elements and the frame members. The members 82 are extruded lengths of material, substantially co-terminous with their respective frame elements. Their sectional form comprises a rear central web 84, analogous to the web 26 and similarly being slotted to receive securing screws 38a the heads of which bear on the root of a forward channel-like formation 86 of the member 82 that is analogous to the formation 18 on each frame member. It will be clear therefore that the frame elements 28a can in their turn be secured to the members 82 by the screws 38 engaging the internal faces of the channel-like formation 86.

The members 82 can be secured in place on the frame members before assembly of the frame begins and the infill with the supporting frame elements can then be mounted in the same way as in the first-described example. In order to take up the increased width of the recess 40a, it is convenient to use a wider zipper strip 60a rather than change the section 32a. The thickness of spacer element 88 between the panes or panels of the sandwich infill of course determines that the elements 28a apply a sufficient clamping force for secure sealing of the infill, and the wider spacing of the side limbs 30 of the elements 28a, as compared with the spacing of these limbs on the elements 28, ensures that the sealing lobes 54 engage the infill panes or panels laterally inwardly of the spacer elements 88.

If it is required to change from a sandwich infill to a single-skin infill in the one structural assembly, the arrangement shown in FIG. 6 indicates one way in which this may be done. The upper half of this figure has the sandwich infill construction already described with reference to FIG. 5 but the lower flange 34 of the transom (and the adjacent flange 34 of the mullion) now carry extruded lengths of an adaptor 90, which comprises a rear channel portion 92 clipping onto the associated flange 34 and a forward flange 94 identical to the flange 34, on which the sealing strip 33 is located to provide a sealing face that is effectively co-planar with the front face of the spacer element 88. To prevent leakage past the spacer elements 88, a resilient sealing strip 96 is gripped between the edges of the sandwich infill and the supplementary member 82. A similar provision would of course be made at the edges of a structural assembly that had a sandwich infill over its whole area.

It will be appreciated that many modifications are possible within the scope of the invention. Thus, although a planar structural assembly has been described, it is possible to employ the invention with curved or multi-planar assemblies. Also, although for simplicity a rectangular frame grid has been described, the frame and its cells can have different forms and it is by no means necessary for the cells to be similar in shape to each other. As regards their size, the cells encompassed by individual closed-loop sealing devices may extend over a number of storeys.

An assembly according to the invention can of course receive infill panes and/or panels of a wide variety of forms. Opening window lights or other ventilation means may be included, for example, and illuminated panels.

It is a feature of the illustrated constructions that the preparation of the individual parts of the frame structure can be completed in controlled conditions away from the building site. Once at the site, it is only necessary to put the parts in place and secure them there. The weather tightness of the assembly is ensured by the closed-loop form of the sealing strips 32 and the way in which the locking or zipper strips seal the junctions between the contiguous portions of adjacent strips.

What I claim and desire to secure by Letters Patent is:

1. A structural assembly comprising, in combination, a frame structure, a series of rigid elongate members being attached together to form said structure and at least two contiguous spaces being defined by the elongate member in the structure to receive infill elements, and means making a seal between the members of each each infill element, said means comprising a flexible sealing device for each said space in the form of a closed loop of a strip-like material engaging the infill element at the periphery of the space, auxiliary rigid frame elements secured to the elongate members clamping said sealing devices in place, at least at the common boundary between each contiguous pair of said spaces, said auxiliary elements comprising forward portions projecting laterally oppositely away from a central portion, a recess being provided between the front faces of the forward portions and each forward portion having a respective flexible sealing device mounted on it, a forward element of said sealing device covering the front face of said forward portion and an inner marginal element of said sealing device extending into said recess in a self-retaining manner, and further, bridging sealing means being provided between the adjacent edges of said inner marginal elements of the respective sealing devices in said recess and lockingly securing the sealing devices in the recess.

2. A structural assembly comprising, in combination, a frame structure, a series of rigid elongate members being attached to form said structure and a series of enclosed spaces being defined by the elongate members in the structure each to receive an infill element, said elongate member including at least one member extending continuously over the extent of at least two contiguous said spaces, means making a seal between the members and each infill element, said means comprising an inner flexible sealing device for each space in the form of a closed loop of a strip-like material engaging the infill element at the periphery of the space, respective auxiliary rigid frame elements for each side of said space being secured to the elongate members forming said space and projecting forwardly of their frame members, said auxiliary elements clamping said sealing device in place, contiguous spaces of said series having a common boundary being provided with respective loop-form sealing devices that are clamped by a common auxiliary frame element at said common boundary, said auxiliary elements comprising forward portions projecting laterally oppositely away from a central portion, a recess being provided between the front faces of the forward portions and each forward portion having a respective flexible sealing device mounted on it, each said sealing device comprising a forward element covering said front face and an inner marginal portion of said sealing device extending from said forward element into said recess in a self-retaining manner, and further, bridging sealing means being provided between adjacent edges of said inner marginal portions of the respective sealing devices in said recess and lockingly securing the sealing devices in the recess.

3. A structural assembly according to claim 1 wherein rear sealing members are provided behind said infill elements in opposition to the loop-form sealing devices whereby to engage sealingly the edges of each said infill element between a loop-form sealing device and the associated rear sealing members.

4. A structural assembly according to claim 1 wherein said forward portion of the auxiliary frame elements extend over the edges of their associated infill elements and thereby to apply sealing pressure to said edges.

5. A structural assembly according to claim 4 wherein each loop-form sealing device comprises a portion disposed at the rear of the forward portions of the auxiliary frame elements clamped in compression between said forward portions and the associated infill element.

6. A structural assembly according to claim 4 wherein rearward projections are provided on said forward portions of the auxiliary elements, the rearward projections being disposed intermediate the lateral extent of said rearwardly disposed portions of the sealing devices adapted to engage the infill element, said clamping pressure being applied through said projections.

7. A structural assembly according to claim 4 wherein each loop-form sealing device has a profiled rear face adapted to bear on the infill element, the profile of the rear face providing a plurality of laterally spaced lines of sealing the infill element to extend substantially parallel to the associated edges of the infill element, a marginal lip of said sealing device disposed beyond the lateral extent of its engaging frame element forward portion having a rear face profile providing one of said lines of sealing.

8. A structural assembly according to claim 7 wherein said profile includes an inner portion within the lateral extent of its engaging frame element and providing a further of said lines of sealing, an intermediate portion between said line of sealing of the lip profile and said inner portion providing an additional line of sealing but projecting rearwardly to a lesser extent than said lip and inner portion before clamping pressure is applied.

9. A structural assembly according to claim 1 having a sandwich infill in at least one cell of the frame structure, said infill comprising two spaced infill elements overlying each other in mutually parallel planes, said auxiliary frame elements extending the depth of said sandwich infill between said parallel planes.

10. A structural assembly according to claim 1 having at least two rigid elongate members directed transversely to each other and junction means connecting together said elongate members permitting relative movement of one of said members towards and away from the other in the direction of the longitudinal axis of said one member, each junction means providing relative location between said secured members in a direction perpendicular to the plane in which the longitudinal axes of the respective members lie.

11. A structural assembly according to claim 1 wherein the auxiliary frame elements comprise a rearwardly directed web, a forwardly open slot being provided in the elongate members to receive said web in a freely fitting manner, openings being formed in the auxiliary frame elements extending over the width of said web and screws in said openings thereby projecting to engage opposed inner faces of said forwardly open slot to secure the auxiliary elements to the elongate members.

12. A structural assembly according to claim 11 wherein said engagement of the screws with said slot inner faces permits relative longitudinal displacement between the auxiliary frame element and its associated elongate member.

*13. A glazing structure comprising an elongated structural member having two spaced apart surfaces to abut against, with or without the interposition of gaskets, the one faces of two panel edge portions respectively, a glazing bead of open channel section whereof the channel base is ar-*

*ranged to engage the structural member between the said surfaces with the side walls of the channel extending outwardly away from the structural member, the side walls being turned outwardly from one another at their end portions to provide abutments facing towards the surfaces to lie opposite the other faces of the edge portions of the panels respectively, means accessible from the outer side of the channel section of the glazing bead to secure the base of the channel of the bead to the structural member and two gaskets of elastomeric material each having a first portion to lie between the abutment and the other faces and second portions to enter within the channel of the glazing bead, the arrangement being such that the glazing bead can first be secured to the structural member with the first portions of the gaskets secured between the bead and the panels to hold the panels in position and the second portions can then be pressed side by side in the channel to form a weatherproof seal for the channel.*

*14. A glazing structure as claimed in claim 13 wherein an additional panel is arranged parallel to and spaced apart from the first panel and where the first portion of each gasket lies between said abutment and the outside face of the additional panel.*

* * * * *